Patented Mar. 10, 1953

2,631,133

UNITED STATES PATENT OFFICE 2,631,133

ZINC BORATE PHOSPHOR AND METHOD OF MAKING SAME

Robert W. Wollentin, Bloomfield, N. J., assignor to Westinghouse Electric Corporation, East Pittsburgh, Pa., a corporation of Pennsylvania No Drawing. Application June 4, 1951, Serial No. 229,870

14 Claims. (Cl. 252—301.6)

My invention relates to luminescent materials and, more particularly, to an improved luminescent material for fluorescent lamps and the method of manufacture.

Zinc borate activated by manganese has been used as a phosphor with low pressure discharge devices and produces a pink light under excitation. Heretofore, the preparation of a zinc borate phosphor has been troublesome; fluxes and agents such as ammonium chloride, zinc chloride, and ammonium sulphate, have been used to simplify the method of manufacture and promote crystallization.

My invention provides a simplified method of manufacturing zinc borate phosphor and also provides a phosphor which has increased fluorescence.

Therefore, an object of my invention is to provide an improved luminescent material.

Another object of my invention is to provide an improved zinc borate phosphor.

Still another object of my invention is to provide a simplified method of preparing a zinc borate phosphor, having magnesium chloride incorporated therein.

The novel features that I consider characteristic of my invention are set forth with particularity in the appended claims. The invention itself, however, together with additional objects and advantages thereof, may be best understood from the following description of specific embodiments.

I have found that the incorporation of magnesium chloride not only simplifies the manufacture of the zinc borate phosphor, but also enhances its fluorescence. Inasmuch as magnesium chloride itself is deliquescent, I prefer to use fused magnesium chloride.

The zinc borate phosphor of my invention is activated by manganese. In the manufacture of the phosphor, the zinc is preferably supplied by zinc oxide, although the carbonate, hydroxide, nitrate or any other compound that will react with a source of boric oxide to form zinc borate may be used. Boron is supplied by orthoboric acid and it has been found advisable to include a 5% excess by weight of boric oxide over that required in the stoichiometric proportions for zinc orthoborate. The excess of boric oxide will give a product with greater fluorescence. The manganese activator may be supplied by manganous chloride or manganese dioxide, and may constitute between .01 and 3.0% of the phosphor by weight; however, 1.0% is optimum.

The magnesium chloride, which, according to my invention, is in solid solution with the zinc borate phosphor, may be present within the range of approximately 0.005 to about 0.75 mole per 3.0 moles of zinc, with about 0.0667 being the optimum. The allowable range and the optimum are the same regardless of whether magnesium chloride or fused magnesium chloride is used in producing the phosphor. I prefer to use the fused magnesium chloride since it simplifies manufacturing and handling. The following examples are given to more clearly illustrate my invention.

Example 1

| Raw Material Ingredients | Grams or parts by wt. |
|---|---|
| ZnO | 48.8 |
| $H_3BO_3$ | 27.2 |
| Fused $MgCl_2.6H_2O$ | 2.20 |
| $MnCl_2.4H_2O$ | 2.26 |

The raw materials are intimately mixed by ballmilling or hammermilling, and fired 1 to 4 hours in open silica containers at about 600° to about 950° C.; the lower temperature requiring the longer time. A convenient heat treatment for the above mixture is 2 hours at 910° C. After firing and cooling, the phosphor may be milled to the desired particle size.

Example 2

| Raw Material Ingredients | Grams or parts by wt. |
|---|---|
| $ZnCO_3$ | 75.2 |
| $B_2O_3$ | 15.3 |
| Fused $MgCl_2.6H_2O$ | 2.20 |
| $MnO_2$ | .99 |

The raw materials are processed as in Example 1. The resultant phosphor is identical to that obtained in Example 1.

The phosphor, made as described above, has an enhanced fluorescent output which is approximately 6% greater than the output of the corresponding phosphor without the magnesium chloride. While we have used magnesium chloride in the examples, magnesium fluoride will act similarly to the chloride and also enhances the fluorescent output of the phosphor. The allowable range and optimum for the amount of magnesium fluoride in the phosphor is the same as that for magnesium chloride when expressed in moles per mole of zinc. Therefore, either magnesium chloride or magnesium fluoride may be incorporated in the zinc borate phosphor to form a solid solution therewith.

It will readily be seen from the above that I have produced a phosphor which has an enhanced fluorescent output, and have also provided a simplified method of manufacturing the phosphor.

While I have shown and described a specific embodiment of my invention, I am fully aware that many modifications thereof are possible. I do not intend to be restricted therefore, except as is necessitated by the scope and the spirit of the appended claims.

I claim:

1. Zinc borate phosphor activated by manganese having in solid solution therewith about 0.0667 mole of fused magnesium chloride per 3.0 moles of zinc.

2. Zinc borate phosphor activated by manganese made with an excess of 5% by weight of boric oxide over the amount needed for stoichiometric proportions, and having in solid solution therewith between about 0.005 to about 0.75 mole of fused magnesium chloride per 3.0 moles of zinc.

3. Zinc borate phosphor activated by manganese having in solid solution therewith about 0.054 mole of magnesium chloride per 3.0 moles of zinc.

4. Zinc borate phosphor activated by manganese made with an excess of 5% by weight of boric oxide over the amount needed for stoichiometric proportions and having in solid solution therewith between about 0.005 to about 0.75 mole of magnesium chloride per 3.0 moles of zinc.

5. A phosphor consisting essentially of the fired reaction product of the following ingredients in about the following proportions by weight: Zinc oxide, 48.8 parts; orthoboric acid, 27.2 parts; fused magnesium chloride 2.20 parts, manganous chloride, 2.26 parts.

6. A phosphor consisting essentially of the fired reaction product of the following ingredients in about the following proportions by weight: Zinc carbonate 75.2 parts; boric oxide, 15.3 parts; fused magnesium chloride, 2.20 parts; manganese dioxide, 0.99 part.

7. The method of manufacturing manganese-activated zinc borate phosphor having fused magnesium chloride in solid solution therewith comprising intimately mixing with about 0.005 to 0.75 mole of the fused magnesium chloride per 3.0 moles of zinc the raw materials necessary to form zinc borate phosphor; firing from 1 to 4 hours at about 600 to about 900° C., cooling and then grinding until the desired particle size is obtained.

8. The method of manufacturing manganese activated zinc borate phosphor having magnesium chloride in solid solution therewith comprising intimately mixing the raw materials to form the zinc borate phosphor with about 0.005 to 0.75 mole of magnesium chloride per 3.0 moles of zinc; firing from 1 to 4 hours at about 600 to about 900° C., cooling and then grinding until the desired particle size is obtained.

9. The method of manufacturing manganese activated zinc borate phosphor having fused magnesium chloride in solid solution therewith comprising, intimately mixing the raw materials necessary to form the zinc borate phosphor with .005 to 0.75 mole of fused magnesium chloride per 3.0 moles of zinc, firing from 1 to 4 hours in an open silicate container at 600 to 900° C., cooling and grinding until the desired particle size is obtained.

10. Zinc borate phosphor activated by manganese having in solid solution therewith about 0.0667 mole of one of the group consisting of magnesium chloride and magnesium fluoride per 3 moles of zinc.

11. Zinc borate phosphor activated by manganese and made with an excess of 5% by weight of boric oxide over the amount needed for stoichiometric proportions and having in solid solution therewith between about 0.005 to about 0.75 mole of one of the group consisting of magnesium fluoride and magnesium chloride per 3 moles of zinc.

12. The method of manufacturing manganese activated zinc borate phosphor having magnesium fluoride in solid solution therewith comprising, intimately mixing the raw materials necessary to form the zinc borate phosphor with .005 to 0.75 mole of magnesium fluoride per 3.0 moles of zinc, firing from 1 to 4 hours in open silicate container at about 600 to 900° C., cooling and grinding until the desired particle size is obtained.

13. Zinc borate phosphor activated by manganese having in solid solution therewith about 0.0667 mole of magnesium fluoride per 3.0 moles of zinc.

14. Zinc borate phosphor activated by manganese with an excess of 5% by weight of boric oxide over the amount needed for stoichiometric proportions, and having in solid solution therewith between about 0.005 to about 0.75 mole of magnesium fluoride per 3 moles of zinc.

ROBERT W. WOLLENTIN.

REFERENCES CITED

The following references are of record in the file of this patent:

UNITED STATES PATENTS

| Number | Name | Date |
| --- | --- | --- |
| 2,056,545 | Varian | Oct. 6, 1936 |
| 2,310,852 | Leverenz | Feb. 9, 1943 |